June 6, 1950 R. M. GRAY 2,510,573
BLOCK HANDLING APPARATUS
Filed March 13, 1948 9 Sheets-Sheet 4

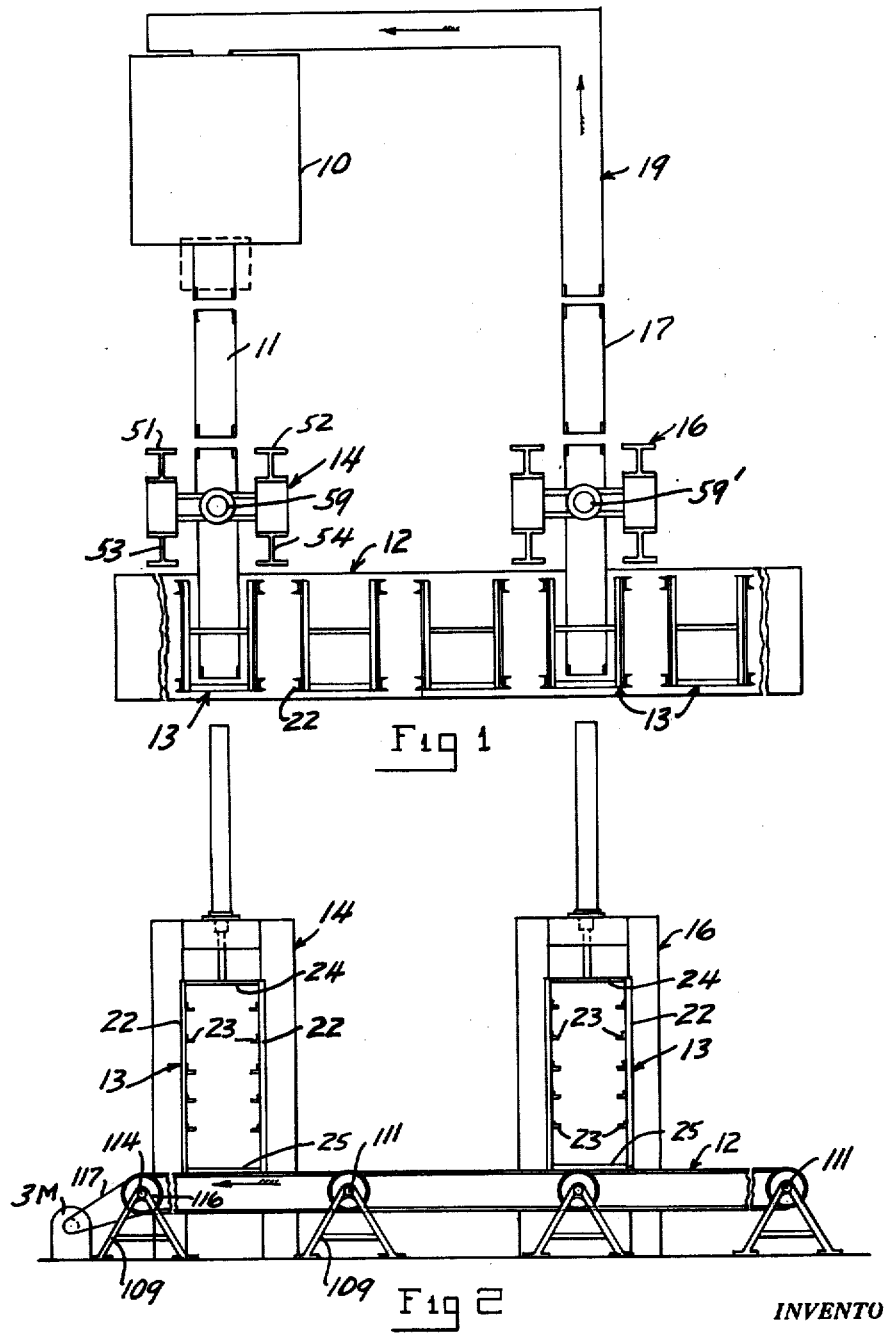

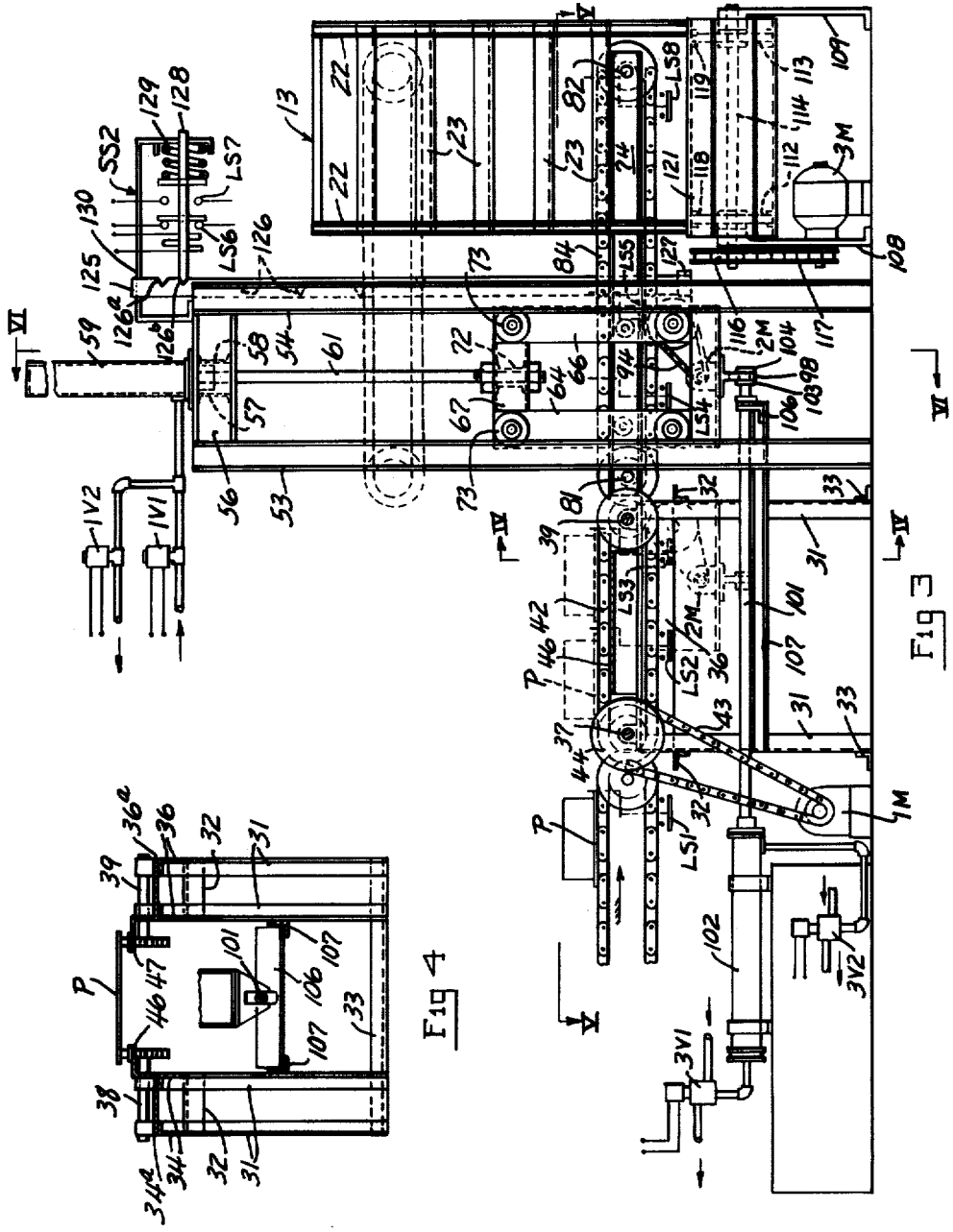

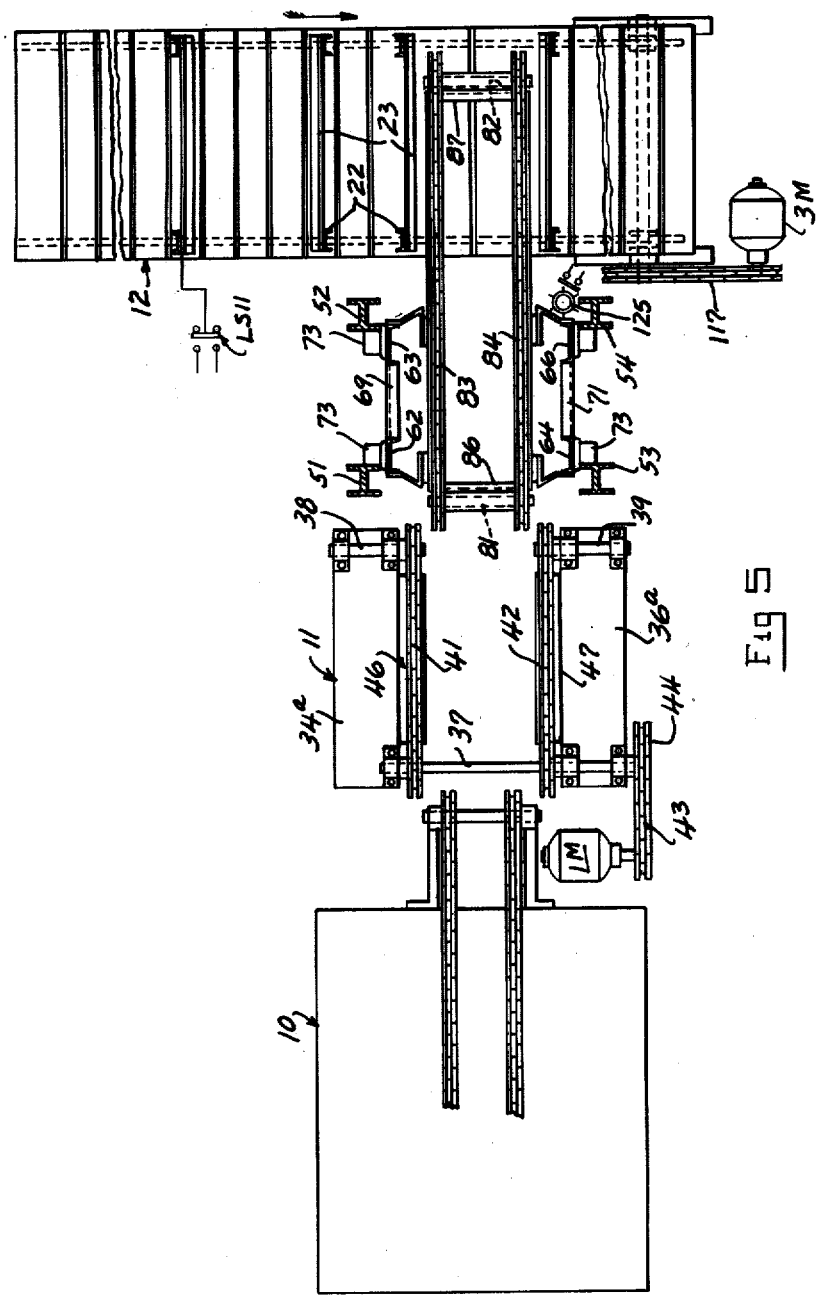

INVENTOR.
ROBERT M. GRAY
BY
ATTORNEY

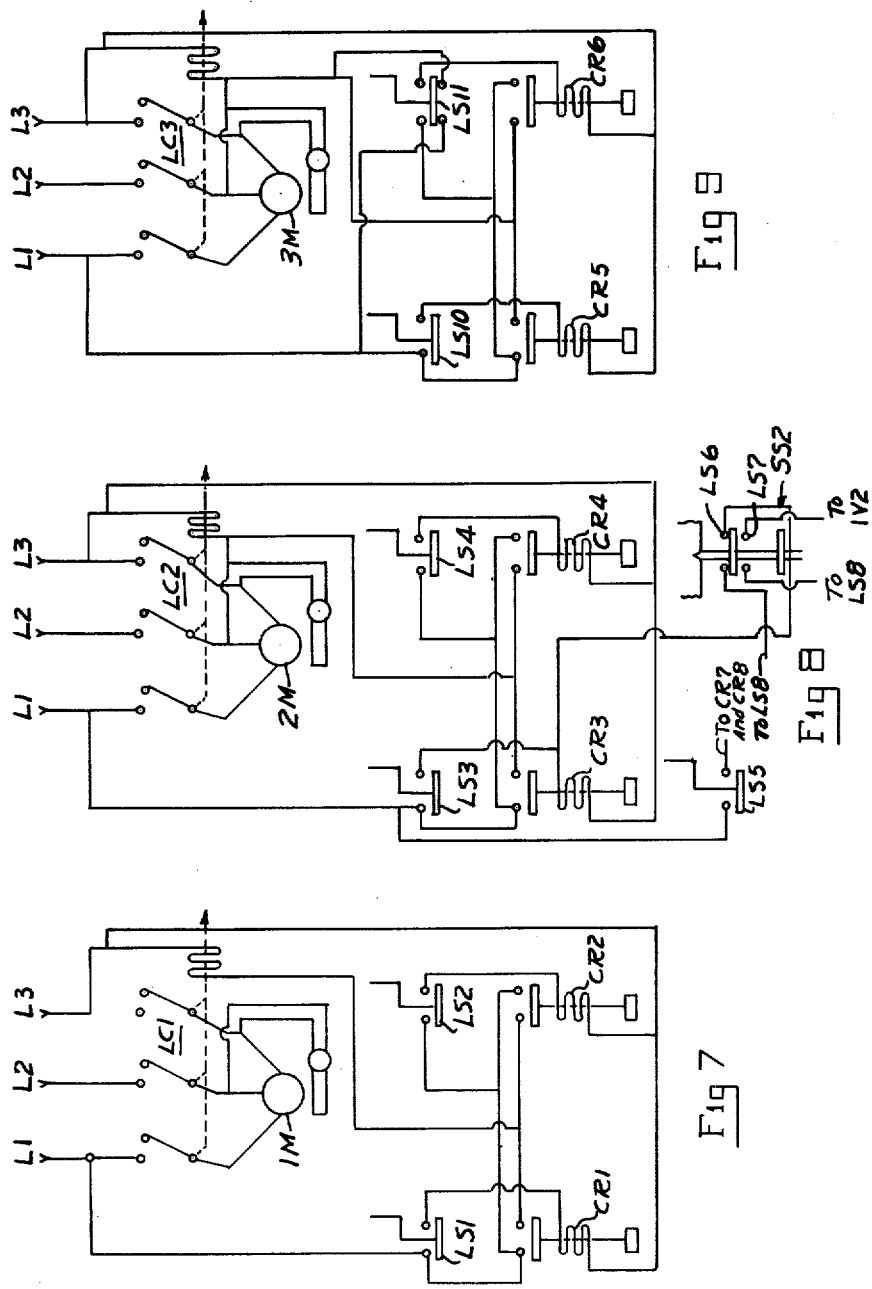

June 6, 1950  R. M. GRAY  2,510,573
BLOCK HANDLING APPARATUS
Filed March 13, 1948  9 Sheets-Sheet 7
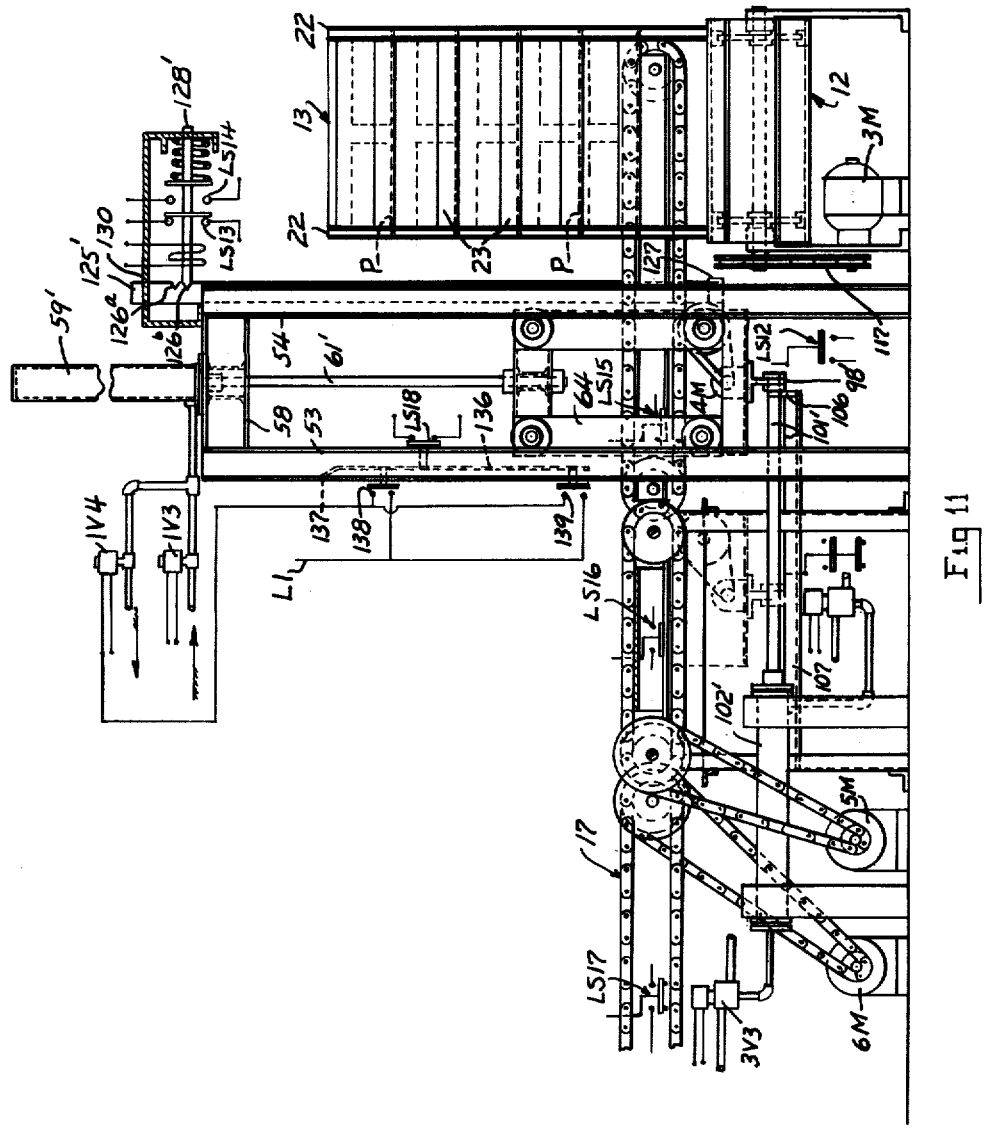
INVENTOR.
ROBERT M. GRAY
BY
ATTORNEY

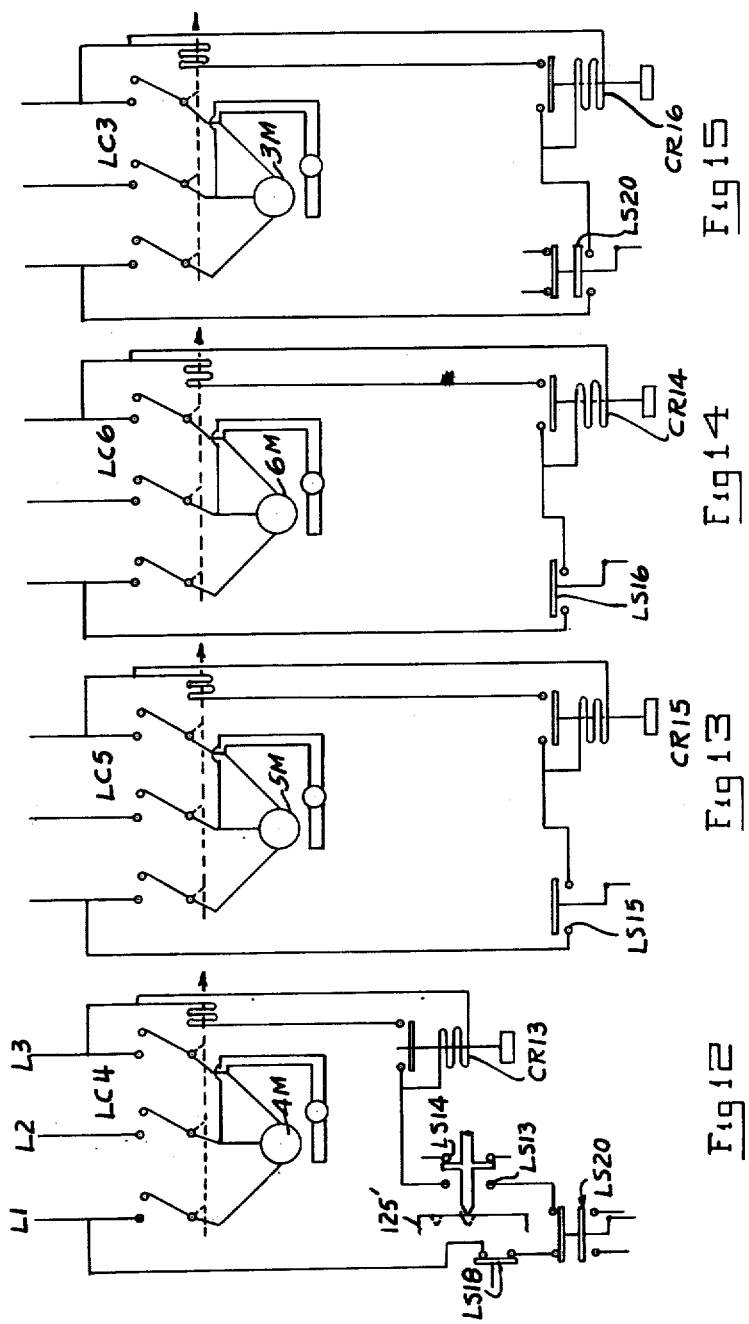

Patented June 6, 1950

2,510,573

UNITED STATES PATENT OFFICE 2,510,573

BLOCK HANDLING APPARATUS

Robert M. Gray, Florence, Ala.

Application March 13, 1948, Serial No. 14,665

11 Claims. (Cl. 214—95)

This invention relates to apparatus for handling concrete blocks as they are delivered from a concrete block making machine, and particularly to a machine for loading and unloading the racks in which the blocks are placed and put in kilns for curing and removed from the kilns after curing.

In my prior Patent No. 2,423,557, dated July 8, 1947, I show, describe and claim apparatus including a circular kiln in which the blocks are cured, together with means to support a multiplicity of racks in the kiln and to load and unload them one rack at a time, as they are moved around the kiln. My present invention is an improvement on that described and claimed in my prior patent aforesaid in that it involves a stationary conveyor and a shuttle conveyor which telescopes into the stationary conveyor and movable outwardly to load and unload the racks, together with means for raising and lowering the shuttle conveyor to accommodate it to the different elevations at which the blocks are loaded or unloaded in the racks.

A particular object of my invention is to provide conveying apparatus for loading and unloading the curing racks for concrete blocks which shall include conveying mechanism with means to raise and lower it to accommodate different elevations in the rack, whereby a rack may be loaded with uncured blocks without disturbing the position of the rack and with a minimum of movement of the blocks.

As is well known in the art to which my invention relates, concrete blocks, when freshly made, are relatively fragile, and must be handled with a minimum of disturbance or else they will break. One of the principal items of loss in the manufacture of concrete blocks has heretofore been caused by the breakage of uncured blocks in handling. My present invention provides a means for handling these blocks with a minimum of jostling of the blocks and without the necessity of constructing a circular kiln as shown in my prior patent.

Apparatus embodying features of my invention is illustrated in the accompanying drawings, forming a part of this application, in which—

Fig. 1 is a fragmental, entirely diagrammatic plan view of a block making plant having my invention installed therein;

Fig. 2 is a side elevation of Fig. 1;

Fig. 3 is a somewhat diagrammatic side elevation, partly in section, of the conveying apparatus employed in loading the racks, and showing the shuttle conveyor in extended position, the retracted position being indicated in dotted lines;

Fig. 4 is a sectional view taken along the line IV—IV of Fig. 3;

Fig. 5 is a sectional plan view taken along the line V—V of Fig. 3;

Fig. 7 is a wiring diagram of the controls for the motor on the stationary conveyor of the loading machine;

Fig. 8 is a wiring diagram of the motor controls for the shuttle conveyor in the loading machine;

Fig. 9 is a wiring diagram of the motor controls for the rack conveyor;

Fig. 11 is a side elevation view of the unloading machine;

Fig. 12 is a wiring diagram of the motor controls for the delivery shuttle conveyor of the unloading machine;

Fig. 13 is a wiring diagram of the motor controls of the stationary unloading conveyor;

Fig. 14 is a wiring diagram of the motor controls for the delivery conveyor of the unloading machine;

Fig. 15 is a wiring diagram of the motor control for the rack conveyor employed when the unloader is being used separately from the loader;

Figure 6:
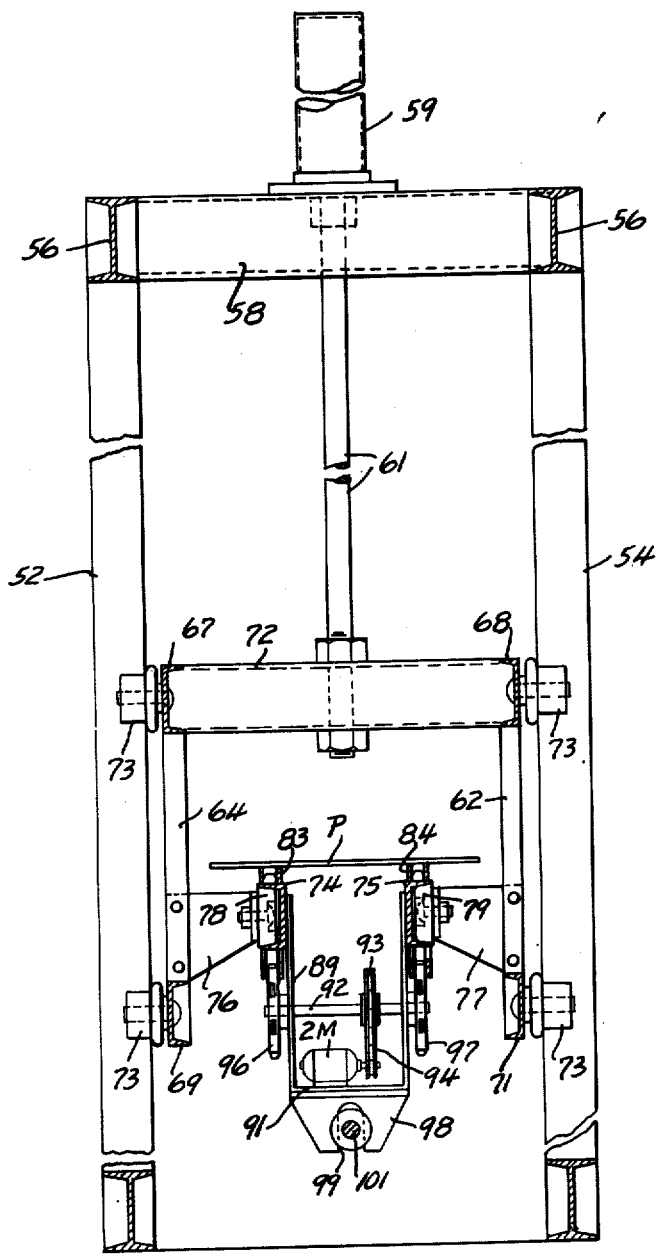
Fig. 6 is a sectional view taken along the line VI—VI of Fig. 3.

Referring now to the drawings for a better understanding of my invention, I show in Fig. 1, a concrete block making plant embodying a block making machine 10, a conveyor 11 for conveying pallets loaded with blocks from the machine 10, a rack conveyor 12 having a multiplicity of racks 13 thereon. At 14 I show my improved loading machine for loading the racks 13 with uncured blocks, and at 16 I show my improved unloading machine for removing the pallets with blocks thereon from the racks from whence they are delivered to a conveyor 17. The blocks may be removed from the pallets by any suitable apparatus not shown, and the pallets returned to the block making machine by means of suitable conveying apparatus 19.

It will be understood that the rack conveyor 12 is of indeterminate length and may, if desired, extend into a curing kiln, not shown. It is contemplated that the loaded racks, 13, loaded with cured blocks from a kiln, not shown, will be placed upon the righthand end of the conveyor shown in Fig. 1 and moved to the left as viewed in Figs. 1 and 2, in front of the unloading machine 16, where the cured blocks are removed and delivered as just described. The empty racks 13 are then moved by the conveyor 12 in front of the loading machine 14 and are there reloaded with uncured blocks to be delivered to a drying kiln, not shown. Each of the racks 13 is comprised of a rectangular frame having upright members 22 at the corners thereof which are joined together along their sides by angles 23 having their flanges turned inward to provide shoulders for supporting the pallets P. The upright members are joined together transversely by means of transverse structural members 24 and 25 at the top and bottom, respectively, see Fig. 2.

In Figs. 3, 4, 5, and 6, I show in detail the apparatus for loading the racks 13. The loading and unloading machines 14 and 16 are identical in construction, but operate in a reverse order. A description of the construction of one of the machines will accordingly serve for both, except for the operating controls. The loading machine is shown in Figs. 3 to 6 of the drawing and comprises a stationary conveyor mounted in a generally rectangular frame having vertical members 31 joined together by structural frame members 32 and 33 at top and bottom, respectively. The upper transverse members 32, as shown in Fig. 4, do not extend all the way across, but join adjacent vertical members 31. Extending longitudinally of the frame and joining the members 31 at the top are a pair of angles 34 on one side of the frame and a similar pair of angles 36 on the other side of the frame. On top of the angles are plates 34a and 36a on which is mounted a shaft 37 at the pallet receiving end of the conveyor. At the pallet discharge end of the conveyor are mounted two short shafts 38 and 39 on the plates 34a and 36a, respectively. The shafts 37, 38, and 39 carry suitable sprockets on which are mounted conveyor chains 41 and 42. The conveyor chains 41 and 42 are driven by a motor 1M through a chain 43 and sprockets 44 mounted on the outer end of the shaft 37. The controls for the motor 1M will be described later. Mounted on the pltaes 34a and 36a are longitudinally extending angles 46 and 47 having their flanges turned inwardly to extend under and form a support for the upper flights of the conveyor chains 41 and 42.

Disposed to receive the pallets P with their blocks B from the stationary conveyor just described is a shuttle conveyor which is supported for operation by means of a rectangular frame having four vertically disposed I beams 51, 52, 53, and 54 at the corners. The I beams are joined together at the top by means of horizontally extending structural members 56 which are in turn joined together by a pair of channels 57 and 58 midway between their ends. On the channels 57 and 58 is mounted a hydraulic cylinder 59 having a piston rod 61 extending downwardly therefrom.

Suspended from the piston rod 61 is a cradle frame which is generally rectangular in shape to fit within the confines of the I beams 51, 52, 53 and 54. The cradle frame is composed of vertically extending channel members 62, 63, 64 and 66 which are joined together at top and bottom by means of longitudinally extending channel members 67, 68, 69 and 71. A pair of transverse channel members 72 join the members 67 and 68 and are connected to the piston rod 61 as shown in Fig. 6. Flanged rollers 73 mounted on the corners of the frame just described cooperate between the frame and the I beams 51, 52, 53 and 54 to guide the frame in its vertical movement.

Mounted within the cradle frame just described, for reciprocation therein, is a shuttle conveyor which will now be described. The shuttle conveyor is comprised of longitudinal frame members 74 and 75 in the form of channels with their flanges turned outwardly. The channels 74 and 75 are so spaced as to enter freely between the side members 22 of the racks 13 and also to enter between the angle members 46 and 47 of the stationary conveyor frame. A pair of brackets 76, only one of which is shown, are mounted on the vertical members 64 of the cradle frame and a similar pair of brackets 77 are mounted on the vertical members 66 of the cradle frame. Rollers 78 are mounted on the inward ends of the brackets 76 to fit within the flanges of the channel 74 and similar rollers 79 are mounted on the inward ends of the brackets 77 to fit between the flanges of the channel 75. Mounted at the ends of the channels 74 and 75 are transverse shafts 81 and 82 carrying sprockets for the reception of conveyor chains 83 and 84. As will be seen in Fig. 6, the upper flights of the conveyor chains 83 and 84 rest on and are supported by the upper flanges of the channels 74 and 75. The channels 74 and 75 are joined together at their ends, for transverse support, by transverse channel members 86 and 87.

Suspended from the channels 74 and 75 is a U-shaped, relatively wide member 89, the bottom 91 thereof extending horizontally and having mounted thereon a driving motor 2M. Extending transversely of the U-frame 89, above the motor 2M, is a shaft 92 carrying a sprocket 93 which is driven from the motor 2M by means of a chain 94. On the outer ends of the shaft 92 are sprockets 96 and 97 which engage with the lower flights of the conveyor chains 83 and 84 to drive them. Extending downwardly from the bottom 91 of the U-frame 89 is an angle member 98 having a downwardly opening slot 99 therein which, when the U-frame is in its lowest position, straddles a piston rod 101 of a hydraulic cylinder 102 which is employed to reciprocate the shuttle conveyor. Nuts 103 and 104 on the piston rod are disposed to engage the member 98 on the opposite sides thereof. As shown the piston rod 101 extends horizontally and is guided in its movements by means of a cross head 106 and guides 107 carried by the upright frame members 31 of the stationary conveyor. The controls for the motor 2M and for the hydraulic cylinder 102 will be described later.

The rack conveyor 12, as shown in Figs. 2 and 3, is of indeterminate length and is composed of a suitable number of A frames 108 to provide support therefor, bearings being provided in the upper ends of the frames for shafts 111 upon which are mounted sprockets 112 and 113. At a suitable point in the length of the conveyor is mounted a drive shaft 114 having a sprocket 116 on its outer end which is driven from a motor 3M and sprocket chain 117. Mounted on the sprockets 112 and 113 are conveyor chains 118 and 119 which are joined together transversely by means of slats 121. Carried by the slats are suitable means, not shown, for positioning the racks 13 thereon.

The operation of my improved loading apparatus, together with the controls for the motors and hydraulic cylinders, will now be described. Assuming first that the rack conveyor 12 is in position to provide an empty rack 13 with its open side in front of the shuttle conveyor, and that the hoist cradle carrying the shuttle conveyor is in its lowest position, and that the shuttle conveyor is advanced to extend into the empty rack. Electric energy for operating the controls is provided through wires L1, L2 and L3. The block machine 10 is first started by closing a manually controlled switch, not shown. The block machine 10 delivers the first pallet P onto the stationary conveyor and in doing so strikes and closes a switch LS1 on the block machine in the path of the pallet P. This closes relays CR1, Fig. 7, which in turn effects the closing of switch LC1 to start motor 1M on the stationary conveyor. The second pallet P, following the first, strikes switch LS1, repeating the operation just described, and the first pallet advances on the stationary conveyor to close a second switch LS2, energizing a relay CR2, to again close switch LC1, and cause the stationary conveyor to advance both pallets. The first pallet then strikes a switch LS3 in its path, which closes relay CR3, to effect the closing of switch LC2 and the starting of motor 2M for operation of the shuttle conveyor. The second pallet is delivered onto the shuttle conveyor in the manner just described and strikes switch LS4, in its path on the shuttle conveyor which again effects the closing of switch LC2 by energizing a relay CR4 and continues the operation of motor 2M to advance both pallets onto the shuttle conveyor just short of its mid position and within the confines of the hoist cradle. As the first pallet assumes its position within the cradle on the shuttle conveyor just described, it strikes and closes a switch LS5 which closes relays CR7 and CR8 to energize a coil for operation of valve 1V1 admitting fluid under pressure to the lower end of hydraulic cylinder 59 to raise the hoist and the cradle, and the shuttle conveyor to the top shelf of the rack. The valve 1V1 is of well known construction and is fully illustrated and described in my prior Patent No. 2,423,557, aforesaid.

Mounted on one of the channels 64 forming the shuttle conveyor cradle is a rotary member 125 which is supported at its lower end in a bearing 127 and is guided at the top by means of an encircling sleeve 130. The member 125 is provided with depressions 126, six in number to equal the number of shelves in a rack 13, plus one.

The depressions 126, except the two upper depressions 126a and 126b are spaced apart, vertically, a distance equal to the vertical distance between the shelves in the racks 13. They are also angularly disposed with respect to each other, 60° apart, for a purpose which will become apparent presently. Mounted on I beam 54 near the top thereof, is a selector switch SS2. The switch SS2 has a stem 128 which is biased toward the rotary member 125 by means of a spring 129 to cause the end of the stem to enter the depressions 126a, 126b and 126 as will be explained.

When the valve 1V1 has been opened to admit hydraulic fluid to the lower end of the cylinder 59, as previously described, the cradle with the shuttle conveyor is raised to its highest position, at which time the stem 128 of the selector switch SS2 drops into the lowest notch 126 on the rotary member 125. This closes selector switch LS6 and opens switch LS7 to again start the shuttle conveyor motor 2M. This advances the pallets, with their blocks, into the rack, above the inwardly turned flanges of the angle members 23 forming the upper shelf.

Figure 10:
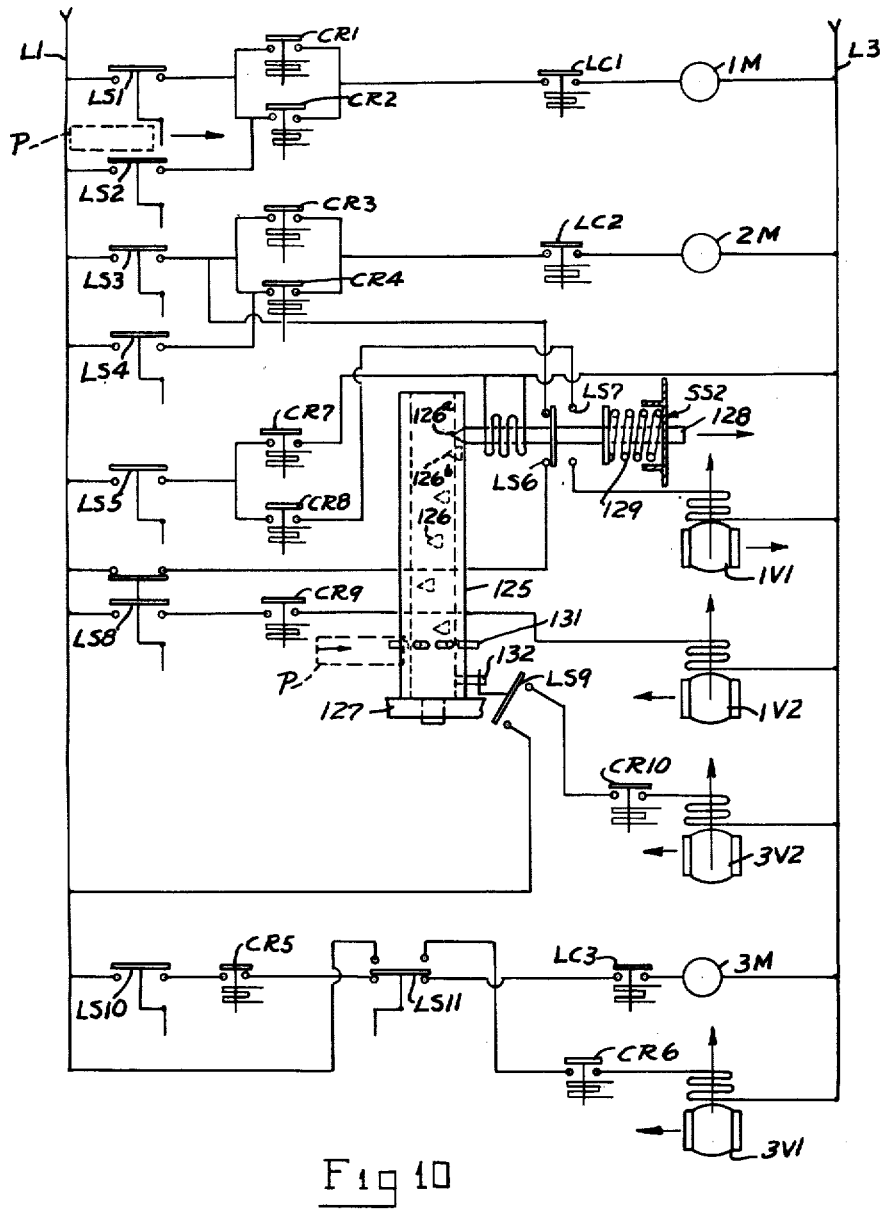
Fig. 10 is a schematic wiring diagram of all the controls for the loading machine.

When the first pallet reaches its outer position in the rack 13, it strikes and closes a switch LS8 on the outer end of the shuttle conveyor. The switch LS8, as shown in Figs. 8 and 10, is a double throw switch. When closed by the action of the first pallet, the lower contacts thereof, as viewed in Fig. 8 are closed, and the upper contacts opened. The upper contacts control switch LC2 through relay CR3 and when opened, open the circuit to stop the motor 2M. The lower contacts of switch LS8 control the magnetically operated valve 1V2, similar to valve 1V1, through relay CR9, to exhaust fluid from the lower end of the hydraulic cylinder 59 permitting the cradle and the shuttle conveyor to move downwardly to its loading position to receive the next pallets from the block making machine, as previously described.

Figure 17:
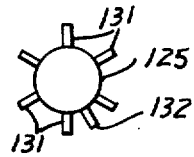
Fig. 17 is a plan view of the rotary selector member.

Carried by the rotary member 125, at the lower end thereof, are six pins 131, see Fig. 17, which are angularly disposed with respect to each other 60° apart. As the top shelf of the rack 13 is being loaded, the first pallet, with its blocks, entering the rack 13 strikes one of the pins 131 rotating the member 125 60° thereby moving the stem 128 of the selector switch SS2 out of the lowest depression 126. This places the second depression 126b from the top in vertical alignment with the pin 128 of the selector switch SS2. As the pallets move onto the shuttle conveyor and the shuttle conveyor is raised in the rack, as previously described, the pin 128 drops into the second depression 126b so that the shelf next to the top of the rack is then loaded. The movement of the pallets into the rack again rotates the member 125 and the next depression is placed in line with the pin 128, and so on, until the rack is filled. Each of the depressions 126 are so located on the member 125 as to stop the shuttle conveyor at a point just above the associated shelf 23 in the rack when loading the rack.

In all of the operations described, it will be understood that the shuttle conveyor moves the pallets outwardly above the shelf being loaded and is then lowered to allow the pallets to rest upon the shelf. When the lowest shelf in the rack is being loaded, the pin 128 will be seated in the depression 126b so that the pallet will move out over the lowest shelf. When the cradle and the shuttle conveyor are then lowered to release the pallet, the pin 128 drops into the depression 126a to lower the cradle and the shuttle conveyor below the lowest shelf in the rack. The rotary member 125 has now been rotated a complete 360° which brings the lowest notch into vertical alignment with the pin 128 for the next cycle of operation. At the lower end of the rotary member 125 is a pin 132 in position, when the cradle with the shuttle conveyor has reached its highest position, to strike and close a switch LS9 carried by the I beam 54. Closing the switch LS9 energizes the coil controlling the magnetically operated valve 3V2, similar to the valve shown in my prior patent aforesaid, through a relay CR10, to admit fluid into the end of hydraulic cylinder 102 to retract the piston rod 101 and the shuttle conveyor, the angle member 98 on the lower end of the shuttle conveyor frame having taken its position over the rod 101, between nuts 103 and 104, when the shuttle conveyor was lowered.

As the piston rod 101 is withdrawn, the angle member 98 strikes and closes a switch LS10, carried by the stationary conveyor, which controls switch LC3 through relay CR5 to energize motor 3M and move the rack conveyor. As the rack conveyor moves, a rack 13 strikes switch LS11, alongside the conveyor, opening its lower contacts and closing the upper. This breaks the circuit to motor 3M and, through relay CR6 energizes magnetic valve 3V1 to admit hydraulic fluid to the outer end of hydraulic cylinder 102 to move piston rod 101 outwardly with the shuttle conveyor into an empty rack. The operations described are repeated as each rack is loaded.

As hereinbefore mentioned, the unloading machine 16 is similar in all respects to the loading machine 14, except for the controls. Mounted on the side of the cradle frame of the unloader is a rotary switch member 125' similar to the switch member 125 associated with the loading machine. Mounted on the side of the cradle frame opposite the rotary switch member 125' in the path of pallets being removed from the rack, as shown in Fig. 18, is a resilient yieldable switch member 136 having its upper end secured at 137 to the one of the I beam members 53 and with its lower end free to move horizontally. The member 136 carries a switch bar 138 with contacts 139 which are adapted to control the exhaust of fluid from the cylinder 59' in a manner to be described later.

Figure 16:
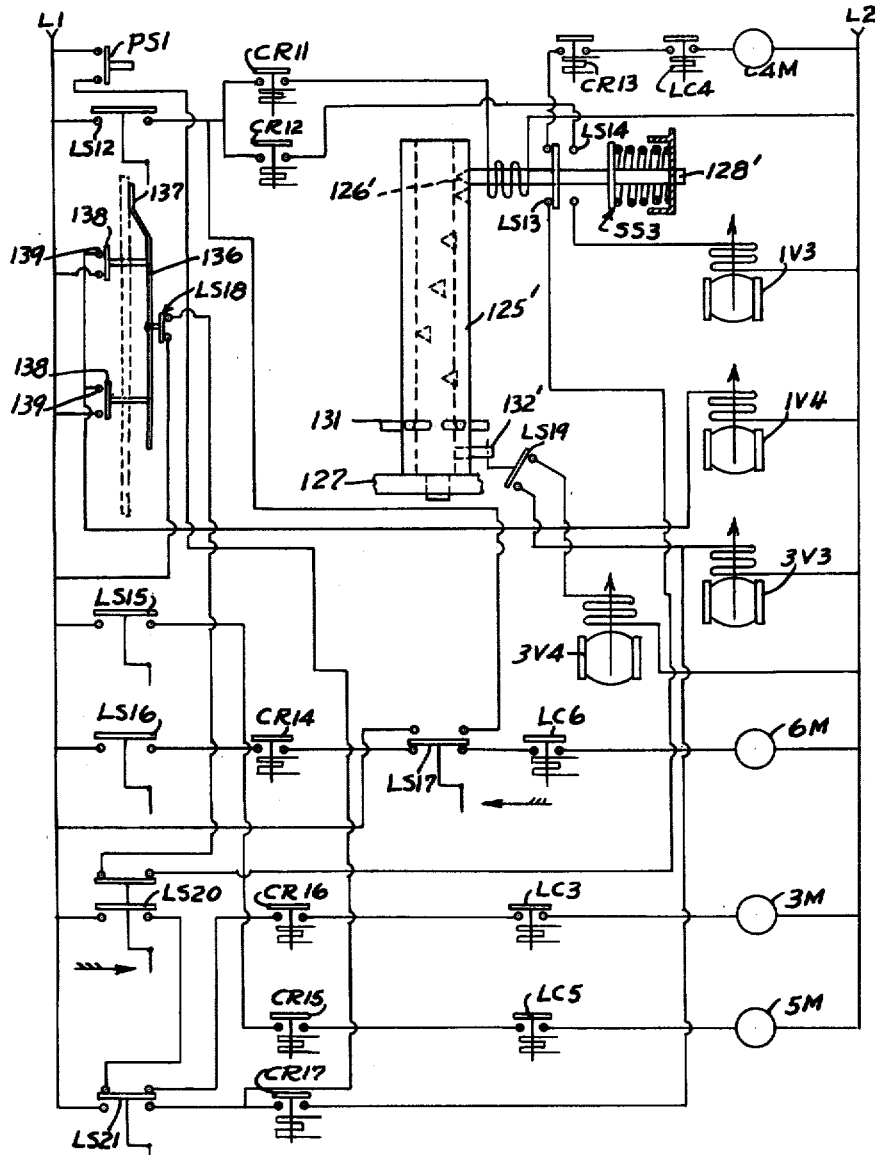
Fig. 16 is a schematic wiring diagram of all the controls for the unloading machine.

Referring now to Figs. 11 to 16 inclusive, assume first that a loaded rack 13 is in position in front of the unloader machine for the shuttle conveyor to enter into the rack to unload it. A manually operated switch PS1 is closed to energize magnetically operated valve 3V3 through relay CR17, admitting fluid into the outer end of cylinder 102' to move the shuttle conveyor outwardly through its cradle into the loaded rack 13, under the lowest loaded shelf thereof. As the shuttle conveyor moves outwardly, member 98' on the bottom of the cradle frame strikes and closes switch LS12 which energizes the operating coil of switch SS2 through relay CR11, and closes contacts LS14 to energize the magnetically operated valve IV3, opening it for fluid to enter the lower end of hoist cylinder 59'. The piston rod 61' moves upwardly taking with it the cradle and shuttle conveyor and clears the first row of pallets off its shelf. As the conveyor rises, stem 128' of switch SS3 moves out of the upper notch 126' of rotary switch member 125' into the next lower notch, corresponding to notch 126b in Fig. 10. This again closes contacts LS13 which start the motor 4M and the shuttle conveyor to carry the pallets out over stationary conveyor. As the pallets move out of the shuttle conveyor they first strike and close switch LS15, then switch LS16 and then switch LS17, to energize motors 5M and 6M through relays CR15 and CR14 respectively. Closing the upper contacts of switch LS17, as shown in Fig. 16, opens the lower contacts controlling motor 6M for conveyor 17 and energizes the coil to switch SS3. This closes contacts LS14 to energize magnetically operated valve IV3 and admit fluid again to the lower end of cylinder 59' to raise the cradle and shuttle conveyor to engage the second row of pallets on the next to the lowest shelf of the rack 13 being unloaded. As the pallets move outwardly, in unloading the lowest shelf of the rack, they rotate the rotary member 125' 60° so that as the cradle moves upwardly, carrying with it the rotor member 125', the stem 128' of the switch SS3 drops into the third notch from the top thus opening the contacts LS14 to stop the admission of fluid to the cylinder 59' and closing contact LS13 to energize motor 4M as previously described. The depressions 126' in the rotary member 125' are so disposed as to stop the elevation of the shuttle conveyor at the point just above the level of each shelf being unloaded. The loaded pallets are thus lifted off the shelves and moved inwardly by the shuttle conveyor. As the shuttle conveyor now moves the pallets off the second shelf inwardly, they strike the switch member 136 to move the switch bars 138, closing the contacts 139, and opening switch LS18. This deenergizes motor 4M and stops the shuttle conveyor from operating. Closing the contacts 138 and 139 energizes the magnetically operated valve IV4, thus exhausting fluid from the lower end of cylinder 59' to allow the cradle with the shuttle conveyor to lower. As soon as the pallet engaging the flexible member 136 moves downwardly below said member, the contacts 138 and 139 are opened, thus deenergizing magnetically operated valve IV4 to stop the descent of the shuttle conveyor. This closes switch LS18 again energizing motor 4M to operate the shuttle conveyor and move the pallets out as previously described.

The operation described is continued until all the pallets have been removed from the shelves of the rack and until pin 132' strikes and closes switch LS19. This energizes the magnetically operated valve 3V4 to cause the piston rod 101' to move inwardly, withdrawing the cradle and the shuttle conveyor from the empty rack. In this position the rotary member 125' controlling switch SS3 has been rotated to starting position. As the shuttle conveyor is moved outwardly, the member 98' strikes and closes the lower contacts of switch LS20 which controls the operation of motor 3M to operate the rack conveyor. It will be understood, however, that if the loading machine and the unloading machine are operating simultaneously, motor 3M will be controlled by the set of controls already described on the loading machine. When the rack conveyor moves the space of one rack, a rack strikes and closes the lower contacts of switch LS21 and opens the upper contacts. This energizes magnetically operated valve 3V3 through relay CR17 to admit fluid under pressure to the outer end of cylinder 102' to move the shuttle conveyor outwardly into the next loaded rack for the cycle of operations described to be repeated.

From the foregoing it will be apparent that I have devised apparatus for loading and unloading concrete blocks into and from racks having multiple superposed shelves, which apparatus is adapted to handle the blocks with a minimum of jostling, thereby greatly minimizing breakage and reducing the manual labor heretofore found necessary.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In apparatus for loading concrete blocks on pallets into a rack having multiple superposed shelves disposed to support the pallets at the sides thereof, a stationary horizontal conveyor for the blocks, a shuttle conveyor disposed to telescope within the stationary conveyor and to receive loaded pallets therefrom, a pressure operated cylinder for moving the shuttle conveyor outwardly into a rack to load it, a pressure operated cylinder for raising the shuttle conveyor to a position above the uppermost empty shelf and operable responsive to the movement of loaded pallets onto the shuttle conveyor, means operable responsive to raising the shuttle conveyor above the uppermost empty shelf to move the loaded pallets outwardly above the empty shelf, and means operable upon movement of the loaded pallets to their outward position on the shuttle conveyor to lower it and deposit the pallets on the shelf and to move it to its initial position to receive additional loaded pallets.

2. Apparatus as defined in claim 1 including control means operable by movement of the loaded pallets on the shuttle conveyor for positioning the shuttle conveyor with respect to the shelves.

3. Apparatus for loading concrete blocks from a block making machine onto superposed shelves of a curing rack comprising a conveyor mounted for vertical and horizontal movement, means to deliver pallets loaded with blocks onto said conveyor, means for moving the conveyor horizontally inward of an empty rack, means operable responsive to the delivery of loaded pallets onto the conveyor for raising it to a position above an empty shelf, means operable responsive to arrival of the conveyor at said position to effect operation thereof to move the loaded pallets outwardly above the empty shelf, and means operable responsive to the arrival of said pallets at said latter position to lower the conveyor while in said outward position.

4. In apparatus for handling concrete blocks on pallets into and out of a curing rack having at least one lower and one upper shelf formed by lateral projections on opposite sides of the rack for engaging the pallets, a reciprocatory conveyor with means to extend the conveyor into the rack between the projections, means to raise and lower the conveyor while extended in the rack, and control means operable responsive to raising the conveyor for selectively positioning the conveyor vertically in the rack with the pallets thereon immediately above a shelf being loaded or unloaded.

5. Apparatus as set forth in claim 4 in combination with means to withdraw the conveyor from the rack operable responsive to completion of the loading or unloading thereof.

6. In apparatus for loading pallets and the like into and removing the same from a rack embodying a plurality of superposed shelves, a shuttle conveyor, means to extend the conveyor into a rack, means to place pallets on the conveyor for loading into the rack, means to raise the shuttle conveyor to a position slightly above one of the shelves, means operable responsive to raising the conveyor to said position to stop and hold the conveyor in raised position, to drive the conveyor thereby to position the pallets thereon over the shelf, means operable responsive to the positioning of said pallets to stop the conveyor when the pallets reach said position and to lower the conveyor to starting position for the reception of other pallets, thereby to deposit said pallets on said shelf, and controls for the shuttle conveyor constructed and arranged to effect unloading by the same of pallets from the loaded rack.

7. In apparatus for loading pallets and the like into racks, each of which embodies at least two centrally open shelves disposed one over the other, a stationary conveyor, a shuttle conveyor adapted to extend outwardly from the stationary conveyor into the racks and when so extended to receive pallets from the stationary conveyor, elevating and lowering mechanism for raising the shuttle conveyor and pallets thereon to position for loading the upper shelf, controls operable responsive to movement of pallets onto the shuttle conveyor to actuate the lift mechanism and operable responsive to arrival of the shuttle conveyor at said loading position to deactuate said mechanism, a motor for operating the shuttle conveyor, controls operable responsive to arrival of the shuttle conveyor at said loading position to energize the motor and move the pallet into the rack over the upper shelf, controls operable responsive to arrival of the pallets over the upper shelf to actuate the lowering mechanism and lower the shuttle conveyor for the reception of other pallets, other controls for positioning the conveyor in loading position with respect to the lower shelf and to load the same and lower the conveyor, and means responsive to completion of loading of the lower shelf to retract the shuttle conveyor from the rack.

8. In apparatus for loading pallets and the like into racks each of which embodies at least two centrally open shelves disposed one over the other, a conveyor disposed to receive the loaded pallet, means to extend the conveyor into the rack with a loaded pallet thereon disposed outside of the rack, means operable responsive to the reception of the pallet to raise the conveyor to loading position with respect to the upper shelf, means operable responsive to the arrival of the conveyor at said loading position to actuate the conveyor thereby to move pallets thereon into the rack over the upper shelf, means operable responsive to the arrival of the pallets over the upper shelf to lower the conveyor for reception of other pallets, means operable responsive to the reception of other pallets to raise the conveyor to loading position with respect to the lower shelf, means operable responsive to the arrival of the conveyor at loading position with respect to the lower shelf to actuate the conveyor thereby to move the pallets thereon into the rack over the lower shelf, and means operable responsive to arrival of the pallets over the lower shelf to lower the conveyor and retract the same from the rack.

9. In apparatus of the character described, a stationary conveyor disposed to receive pallets loaded with blocks, a shuttle conveyor embodying a pair of chains onto which pallets are delivered from the stationary conveyor, a frame for supporting the chains, a first hydraulic cylinder for moving the frame inwardly and outwardly with respect to the stationary conveyor, a rack conveyor disposed to receive and position multi-shelved racks in front of the shuttle conveyor whereby when moved outwardly the outer end of the shuttle conveyor enters the rack, a second hydraulic cylinder having a piston rod operatively connected to the frame for raising the shuttle conveyor, an electric motor carried by the frame and disposed to drive the shuttle conveyor chains, controls for the first cylinder to move the shuttle conveyor outwardly into a rack, other controls operable responsive to arrival of the shuttle conveyor within the rack to raise the same to loading position with respect to an upper shelf thereof, controls for energizing and stopping the motor to position the pallets on the chains over the upper shelf, controls for the first cylinder to lower the shuttle conveyor for the reception of other pallets, other controls for effecting similar vertical movement of the conveyor and of the chains to load successive lower shelves of the rack, and means responsive to completion of loading of a lower shelf to move the shuttle conveyor inwardly of the stationary conveyor, thereby to withdraw its outer end from the rack.

10. Apparatus as defined in claim 9 in which the stationary conveyor embodies a pair of spaced chains, an electric motor for driving the stationary conveyor chains, and switches controlling said motor operative responsive to the positioning of a pallet on the stationary conveyor to energize the motor, thereby to deliver pallets onto the shuttle conveyor.

11. Apparatus as defined in claim 9 in which the shuttle conveyor is provided with a switch controlling the electric motor thereof, said switch being disposed to be struck and closed by pallets delivered onto the shuttle conveyor, a magnetically operated valve for admitting fluid to and discharging the same from said second cylinder to respectively raise and lower the conveyor, a second switch carried by the shuttle conveyor and disposed to be struck by pallets received thereby, and circuits connecting said second switch and said magnetically operated valve, thereby to lower the shuttle conveyor when the second switch is closed.

ROBERT M. GRAY.

REFERENCES CITED

The following references are of record in the file of this patent:

UNITED STATES PATENTS

| Number | Name | Date |
|---|---|---|
| 944,846 | Clark | Dec. 28, 1909 |
| 1,339,712 | Pauly | May 11, 1920 |
| 1,357,315 | Dupuy | Nov. 2, 1920 |
| 1,399,325 | Straub | Dec. 6, 1921 |
| 1,490,076 | Luce | Apr. 8, 1924 |
| 1,491,771 | Fuller | Apr. 22, 1924 |
| 1,629,771 | Young | May 24, 1927 |
| 2,423,557 | Gray | July 8, 1947 |

FOREIGN PATENTS

| Number | Country | Date |
|---|---|---|
| 450,251 | Great Britain | July 7, 1936 |